US009637826B2

(12) United States Patent
Suzuki et al.

(10) Patent No.: US 9,637,826 B2
(45) Date of Patent: May 2, 2017

(54) STEEL SHEET FOR CONTAINERS AND MANUFACTURING METHOD FOR SAME

(75) Inventors: Takeshi Suzuki, Chiba (JP); Norihiko Nakamura, Chiba (JP); Yuka Miyamoto, Kanagawa (JP); Yoichi Tobiyama, Okayama (JP)

(73) Assignee: JFE STEEL CORPORATION, Tokyo (JP)

( * ) Notice: Subject to any disclaimer, the term of this patent is extended or adjusted under 35 U.S.C. 154(b) by 722 days.

(21) Appl. No.: 13/823,409

(22) PCT Filed: Sep. 14, 2011

(86) PCT No.: PCT/JP2011/070983
§ 371 (c)(1),
(2), (4) Date: Apr. 30, 2013

(87) PCT Pub. No.: WO2012/036202
PCT Pub. Date: Mar. 22, 2012

(65) Prior Publication Data
US 2013/0209827 A1 Aug. 15, 2013

(30) Foreign Application Priority Data
Sep. 15, 2010 (JP) ................. 2010-207346

(51) Int. Cl.
C23C 22/05 (2006.01)
C23C 28/00 (2006.01)
C25D 11/00 (2006.01)
C23C 22/34 (2006.01)
C23C 22/00 (2006.01)
C23C 30/00 (2006.01)
B32B 1/08 (2006.01)
B32B 15/09 (2006.01)
B32B 15/18 (2006.01)
(Continued)

(52) U.S. Cl.
CPC ............... *C23C 28/00* (2013.01); *B32B 1/08* (2013.01); *B32B 15/09* (2013.01); *B32B 15/18* (2013.01); *C23C 22/00* (2013.01); *C23C 22/05* (2013.01); *C23C 22/34* (2013.01); *C23C 22/36* (2013.01); *C23C 22/83* (2013.01); *C23C 28/32* (2013.01); *C23C 28/321* (2013.01); *C23C 28/322* (2013.01); *C23C 28/34* (2013.01); *C23C 28/3455* (2013.01); *C23C 30/00* (2013.01); *C23C 30/005* (2013.01); *C25D 5/12* (2013.01); *C25D 5/505* (2013.01); *C25D 9/08* (2013.01); *C25D 11/00* (2013.01); *C25D 11/36* (2013.01); *B32B 2250/03* (2013.01); *B32B 2250/40* (2013.01); *B32B 2255/06* (2013.01); *B32B 2255/205* (2013.01); *B32B 2255/26* (2013.01); *B32B 2255/28* (2013.01); *B32B 2439/66* (2013.01); *Y10T 428/12535* (2015.01); *Y10T 428/12556* (2015.01); *Y10T 428/12569* (2015.01); *Y10T 428/12597* (2015.01); *Y10T 428/12604* (2015.01); *Y10T 428/12611* (2015.01); *Y10T 428/12618* (2015.01); *Y10T 428/12708* (2015.01); *Y10T 428/12722* (2015.01); *Y10T 428/12944* (2015.01); *Y10T 428/12958* (2015.01); *Y10T 428/12972* (2015.01); *Y10T 428/12979* (2015.01); *Y10T 428/2495* (2015.01); *Y10T 428/24967* (2015.01); *Y10T 428/263* (2015.01);
(Continued)

(58) Field of Classification Search
CPC ....... B32B 1/08; B32B 15/18; B32B 2250/03; B32B 2250/40; B32B 2255/06; B32B 2255/25; B32B 2255/26; B32B 15/015; B32B 15/013; B32B 2255/28; B32B 2439/66; B32B 15/09; B32B 15/04; B32B 15/043; B32B 2439/00; C23C 22/36; C23C 22/83; C23C 22/05; C23C 28/00; C23C 28/321; C23C 28/322; C23C 28/34; C23C 28/3455; C23C 22/00; C23C 22/34; C23C 28/32; C23C 30/00; C23C 30/005; C23C 2222/00; Y10T 428/12535; Y10T 428/265; Y10T 428/263; Y10T 428/12569; Y10T 428/264; Y10T 428/12556; Y10T 428/12597; Y10T 428/12604; Y10T 428/12611; Y10T 428/12618; Y10T 428/12944; Y10T 428/12958; Y10T 428/12972; Y10T 428/12979; Y10T 428/12722; Y10T 428/27; Y10T 428/2495; Y10T 428/24967; Y10T 428/12708; Y10T 428/31678
See application file for complete search history.

(56) References Cited

U.S. PATENT DOCUMENTS

| 2005/0175798 A1 | 8/2005 | Kurokawa et al. |
| 2010/0203355 A1 | 8/2010 | Kadowaki et al. |
| 2010/0230288 A1 | 9/2010 | Kurokawa et al. |

FOREIGN PATENT DOCUMENTS

| CN | 101410553 | 4/2009 |
| EP | 2006416 | 12/2008 |

(Continued)

OTHER PUBLICATIONS

Machine Translation, Tanaka Takumi, JP 2007-119867, May 2007.*
(Continued)

*Primary Examiner* — Michael E La Villa
(74) *Attorney, Agent, or Firm* — Young & Thompson

(57) ABSTRACT

A steel sheet for containers that has excellent film adhesion qualities, and has; a chemical conversion coating formed by immersing or subjecting to electrolytic treatment a steel sheet in a solution containing Zr ions, F ions, with adhesion amount of 0.1 to 100 mg/m$^2$ for metal Zr and no more than 0.1 mg/m$^2$ for F; and a hydroxyl acid treatment layer formed on the chemical conversion coating, the layer having a C adhesion amount of 0.05 to 50 mg/m$^2$.

9 Claims, No Drawings

(51) Int. Cl.
    *C25D 5/12*    (2006.01)
    *C25D 5/50*    (2006.01)
    *C23C 22/36*   (2006.01)
    *C23C 22/83*   (2006.01)
    *C25D 9/08*    (2006.01)
    *C25D 11/36*   (2006.01)

(52) U.S. Cl.
CPC ........ *Y10T 428/264* (2015.01); *Y10T 428/265* (2015.01); *Y10T 428/27* (2015.01); *Y10T 428/31678* (2015.04)

(56) References Cited

FOREIGN PATENT DOCUMENTS

| | | |
|---|---|---|
| JP | 2004-285380 | 10/2004 |
| JP | 2005-097712 | 4/2005 |
| JP | 2007-119867 | 5/2007 |
| JP | 2009-068108 | 4/2009 |
| JP | 2009-249691 | 10/2009 |
| JP | 2010-013728 | * 1/2010 |

OTHER PUBLICATIONS

Machine Translation, Hirano et al., JP 2010-013728, Jan. 2010.*
CN Office Action dated Apr. 11, 2014; Application No. 201180044269.4.
International Search Report PCT/JP2011/070983 dated Dec. 20, 2011, with English translation.
CN Office Action dated May 14, 2014; Application No. 201180044269.4.

* cited by examiner

STEEL SHEET FOR CONTAINERS AND MANUFACTURING METHOD FOR SAME

TECHNICAL FIELD

The present invention relates to a metallic sheet that is used after being formed into containers such as cans, in particular to a steel sheet for containers that has excellent adhesiveness with an organic resin such as a plastic film, and a method of manufacturing the same.

BACKGROUND ART

Metallic sheets such as tin-plated steel sheets and electrolytically chromic acid-treated steel sheets called tin-free steel sheets are used for various metallic cans such as beverage cans, food cans, pail cans, and 18-liter cans. Among these, tin-free steel sheets are manufactured by subjecting steel sheets to an electrolytic treatment in a bath containing hexavalent chrome, and are characterized in that they have excellent resin adhesiveness with a coating material or the like.

In recent years, there has been a tendency for usage of hexavalent chrome to be restricted worldwide due to an increase in concern regarding the environment, and an alternative material to the tin-free steel sheet, which is manufactured by using a hexavalent chrome bath, has been requested. As an alternative material to the tin-free steel sheet which does not use chrome, for example, Patent Literature 1 discloses a steel sheet for containers which is subjected to an electrolytic treatment in a tungstic acid solution. In addition, Patent Literature 2 discloses a surface-treated metallic material in which an inorganic surface treatment layer that contains Zr, O, and F as a main component and substantially does not contain a phosphate ion is formed on a surface thereof.

To date, various metallic cans have been manufactured by forming a coating on a metallic sheet such as a tin-free steel sheet and by forming the resultant coated metallic sheet into a can body. However, in recent years, a method in which a laminated metallic sheet (resin-coated metallic sheet), which is obtained by laminating a metallic sheet with a resin such as a plastic film instead of a coating is formed into a can body, has been frequently used so as to reduce the amount of manufacturing-related waste. In the laminated metallic sheet, it is necessary for the resin and the metallic sheet to tightly adhere to each other. In particular, in a laminated metallic sheet that is used to make a beverage can or a food can, since the neck portion of the can is subjected to drawing and ironing, and after the can has been filled with its contents, the resultant can is subjected to a retort sterilization process, strong resin adhesiveness is required in order for a steel sheet-resin adhesion portion subjected to a high degree of forming not to peel off even in a high-temperature wet environment. As a steel sheet for cans subjected to a high degree of forming, a steel sheet for containers which is excellent in terms of weldability, corrosion resistance and coating material adhesiveness, and furthermore, excellent in terms of film adhesiveness, particularly, film adhesiveness at a highly formed portion (hereinafter, referred to as highly-formed-film adhesiveness) has been required.

CITATION LIST

Patent Literature

Patent Literature 1: JP-A-2004-285380
Patent Literature 2: JP-A-2005-97712

SUMMARY OF INVENTION

Technical Problems

An object of the invention is to provide a steel sheet for containers, which is excellent in terms of highly-formed-film adhesiveness.

Solution to Problems

In order to achieve the above-described object, the inventors of the present invention diligently carried out an investigation. As a result, it was found that a steel sheet having a hydroxy acid-treated layer on a Zr compound film which was formed on the steel sheet by immersing or electrolytically treating the steel sheet in a solution containing Zr ions and F ions, is excellent in terms of highly-formed-film adhesiveness, and thus, the present invention was accomplished.

That is, the invention provides the following.

(1) A steel sheet for containers, having:
a chemical conversion coating which is formed by immersing or electrolytically treating a steel sheet in a solution containing Zr ions and F ions, the adhesion amount of which is within a range of 0.1 mg/m$^2$ to 100 mg/m$^2$ as an amount of metal Zr and 0.1 mg/m$^2$ or less as an amount of F; and
a hydroxy acid-treated layer which is formed on the chemical conversion coating, and the adhesion amount of which is within a range of 0.05 mg/m$^2$ to 50 mg/m$^2$ as an amount of C.

(2) The steel sheet for containers according to (1),
wherein the solution further contains phosphate ions, and
the adhesion amount of the chemical conversion coating is within a range of 0.1 mg/m$^2$ to 50 mg/m$^2$ as an amount of P.

(3) The steal sheet for containers according to (1) or (2),
wherein the hydroxy acid is at least one selected from among a citric acid, a tartaric acid, a glycolic acid, a lactic acid, a glyceric acid and a mandelic acid.

(4) The steel sheet for containers according to any one of (1) to (3),
wherein the steel sheet is a surface-treated steel sheet having a surface treatment layer which contains 5 mg/m$^2$ to 1,000 mg/m$^2$ of Ni or 100 mg/m$^2$ to 15,000 mg/m$^2$ of Sn, on at least one surface thereof.

(5) The steel sheet for containers according to any one of (1) to (4),
wherein the steel sheet is a surface-treated steel sheet having an underlying Ni layer which is a Ni plating layer or an Fe—Ni alloy plating layer and contains 5 mg/m$^2$ to 150 mg/m$^2$ of Ni, and a Sn island plating layer which is the remainder of a Sn plating layer and is not alloyed, the Sn island plating layer being formed by plating 300 mg/m$^2$ to 3,000 mg/m$^2$ of Sn on the underlying Ni layer, and alloying a part or the entirety of the underlying Ni layer and a part of the Sn plating layer by a tin melting treatment.

(6) a method of manufacturing a steel sheet for containers according to any one of (1) to (5), the method comprising:
immersing or electrolytically treating the steel-sheet in a solution containing Zr ions and F ions to form a chemical conversion coating on the steel sheet, the adhesion amount of the chemical conversion coating being within a range of 0.1 mg/m$^2$ to 100 mg/m$^2$ as an amount of metal Zr and 0.1 mg/m$^2$ or less as an amount of F, and
immersing the steel sheet having the chemical conversion coating in a hydroxy acid-containing aqueous solution, or applying the hydroxy acid-containing aqueous solution onto the chemical conversion coating, and
drying the resultant steel sheet.
(7) The method of manufacturing a steel sheet for containers according to (6),
wherein the temperature of the drying step is 70° C. or higher.
(8) The method of manufacturing a steel sheet for containers according to (6) or (7),
wherein after the drying step, the steel sheet is washed, with water having a temperature of 80° C. or higher and is further dried.

Advantageous Effects of Invention

According to the invention, it is possible to provide a steel sheet for containers which is excellent in terms of weldability, corrosion resistance and coating material adhesiveness, and furthermore, excellent in terms of highly-formed-film adhesiveness; a manufacturing method thereof; and metallic can and can lid using the same.

DESCRIPTION OF EMBODIMENTS

Hereinafter, a steel sheet for containers of the invention will be described in detail.

1. The base sheet that is used in the invention is not particularly limited, and a steel sheet which is commonly used as a container material may be used. The manufacturing method, material, and the like of the base sheet are not particularly limited, and the base sheet is manufactured using processes from a common billet manufacturing process to processes such as hot rolling, acid washing, cold rolling, annealing, and temper rolling. The base sheet may be provided with a surface treatment layer which contains one or more kinds of Ni and Sn. The method of providing the surface treatment layer is not particularly limited.

2. Surface Treatment

A surface-treated steel sheet has a surface treatment layer containing Sn (tin) or Ni (nickel) on at least one surface of the steel sheet. Although not particularly limited, it is preferable that the surface treatment layer contains 5 mg/m$^2$ to 1,000 mg/m$^2$ of Ni or 100 mg/m$^2$ to 15,000 mg/m$^2$ of Sn for one surface.

Sn exhibits excellent formability, weldability and corrosion resistance, and it is preferable that the amount of Sn be 100 mg/m$^2$ or more as an amount of metal Sn to exhibit these effects. It is preferable that 200 mg/m$^2$ or more of Sn be included to secure sufficient weldability, and 1,000 mg/m$^2$ or more of Sn be included to secure sufficient formability. The effect of improving formability and weldability due to Sn increases with the adhesion amount of Sn, but since the effect of improving corrosion resistance becomes saturated at 15,000 mg/m$^2$ or more, an adhesion amount of 15,000 mg/m$^2$ or more is economically disadvantageous. Accordingly, it is preferable that the adhesion amount of Sn be 15,000 mg/m$^2$ or less as an amount of metal Sn. In addition, a Sn alloy layer is formed by performing a reflow treatment after Sn plating, thereby corrosion resistance is further improved.

Ni exhibits an effect on coating material adhesiveness, film adhesiveness, corrosion resistance and weldability, and thus it is preferable that 5 mg/m$^2$ or more of Ni be contained as metal Ni. The effect of improving film adhesiveness, corrosion resistance and weldability due to Ni increases with the adhesion amount of Ni, but since the improvement effect becomes saturated at 1,000 mg/m$^2$ or more, an adhesion amount of 1,000 mg/m$^2$ or more is economically disadvantageous. Furthermore, it is preferable that the adhesion amount of Ni be set to 10 mg/m$^2$ or more and 1,000 mg/m$^2$ or less as an amount of metal Ni.

Specifically, the surface treatment layer is preferably a plating layer composed of Ni or Sn. From the viewpoint of a uniform coating property of a chemical conversion coating containing Zr that is formed on the plating layer, the plating layer is preferably a steel sheet having a plating layer which includes an intermediate layer formed from a single layer of an Fe—Sn—Ni alloy layer or an Fe—Sn alloy layer, or an intermediate layer formed from a composite layer of an Fe—Ni alloy layer as the lowest layer and an Fe—Sn—Ni alloy layer formed on an upper surface of the lowest layer, and a metal Sn layer formed on an upper surface of the intermediate layer.

More specifically, the surface-treated steel sheet is a surface-treated steel sheet having an underlying Ni layer which is a Ni plating phase or an Fe—Ni alloy plating phase and contains 5 mg/m$^2$ to 150 mg/m$^2$ of Ni, and a Sn island plating layer which is the remainder of a Sn plating layer that has not been alloyed. The Sn island plating layer is formed by plating 100 mg/m$^2$ to 3,000 mg/m$^2$ of Sn on the underlying Ni layer, and alloying a part or the entirety of the underlying Ni layer and a part of the Sn plating layer by performing a tin melting treatment.

When the adhesion amount of Sn in the plating layer is less than 100 mg/m$^2$, there is a tendency for the corrosion resistance to decrease. On the other hand, when the adhesion amount of Sn exceeds 3,000 mg/m$^2$, the plating layer becomes too thick, and thus the advantage of low cost may be lost. The adhesion amount of Sn may be measured by an electrolytic stripping method or surface analysis using fluorescent X-rays.

The tin melting treatment which is performed after Sn plating has been performed on a steel sheet or a plated steel sheet on which nickel plating has been performed is also referred to as a reflow treatment. After the Sn plating has been performed, the tin melting treatment is performed to obtain surface gloss by raising the temperature to 232° C., which is the melting point of Sn, or higher to melt the Sn on the surface of the steel sheet. In addition, when the tin melting treatment is performed, the Sn on the surface is melted, the melted Sn is alloyed with the underlying steel sheet or the underlying metal sheet and a Sn—Fe alloy layer or a Sn—Fe—Ni alloy layer is formed, thereby the corrosion resistance of the alloy layer is improved. Furthermore, if the tin melting treatment is appropriately controlled, it is possible to form Sn islands. Thereby, it is possible to manufacture a surface-treated steel sheet having a plating structure in which an Fe—Ni alloy plating layer or an Fe—Ni—Sn alloy plating layer, which does not contain metal Sn and which is excellent in terms of coating material adhesiveness and film adhesiveness, is exposed.

3. Chemical Conversion Coating

A chemical conversion coating containing a Zr compound and F is provided directly on the steel sheet or provided on an upper layer of the surface treatment layer containing one or more kinds of Ni and Sn to obtain a chemical conversion coating-coated steel sheet. Examples of the method of providing the chemical conversion coating include a method in which the steel sheet is immersed in an acidic aqueous solution in which Zr ions and F ions are dissolved, and a method using a cathode electrolytic treatment. In the immersion treatment, various kinds of films are formed by etching the underlying layer and processing time becomes long. Thus, the immersion treatment is industrially disadvantageous. On the other hand, in the cathode electrolytic treatment, a uniform film can be obtained by forced charge transfer and surface cleaning due to generation of hydrogen on a steel sheet interface and an adhesion promoting effect due to an increase in pH. Furthermore, in the cathode electrolytic treatment, if nitric acid ions and ammonium ions coexist in a treatment liquid, it is possible to promote the precipitation of a Zr compound film, which contains a Zr oxide or Zr—P oxide and which has an excellent effect of improving corrosion resistance or adhesiveness, by performing the treatment for a short period of time from several seconds to several tens of seconds. Thus, the cathode electrolytic treatment is industrially advantageous. Accordingly, in providing the chemical conversion coating, the cathode electrolytic treatment is desirable, and in particular, the cathode electrolytic treatment in a treatment liquid in which nitric acid ions and ammonium ions coexist is preferable.

In the treatment liquid used in the cathode electrolytic treatment, the concentration of ammonium ions is appropriately adjusted within a range of approximately 100 mass ppm to 10,000 mass ppm and the concentration of nitric acid ions is appropriately adjusted within a range of approximately 1,000 mass ppm to 20,000 mass ppm depending on the production facility or production rate (capacity). In the cathode electrolytic treatment, the current density may be set within a range of 0.05 $A/dm^2$ to 50 $A/dm^2$, and the electrolysis time may be set within a range of 0.01 seconds to 10 seconds.

The Zr compound has a function of securing corrosion resistance and adhesiveness. The Zr compound is considered to be a Zr hydrous oxide composed of a Zr oxide and a Zr hydroxide, and a Zr—P oxide, and these Zr compounds have excellent corrosion resistance and adhesiveness. Accordingly, as Zr film thickness increases, corrosion resistance or adhesiveness starts to increase, and when the amount of metal Zr becomes 0.1 $mg/m^2$ or more, corrosion resistance and adhesiveness are at levels causing no practical problems. Furthermore, as the amount of Zr film further increases, the effect of improving corrosion resistance and adhesiveness also increases, but when the amount of Zr film, given as an amount of metal Zr, exceeds 100 $mg/m^2$, the Zr film becomes too thick, and thus, the adhesiveness of the Zr film itself deteriorates, and also electrical resistance increases, which results in deterioration of weldability. Therefore, the adhesion amount of the Zr film is set within a range of 0.1 $mg/m^2$ to 100 $mg/m^2$ as an amount of metal Sr.

It is preferable that the adhesion amount of the zirconium film be within a range of 0.1 $mg/m^3$ to 9 $mg/m^2$ as an amount of metal zirconium. More preferably, the adhesion amount of the zirconium film is within a range of 1 $mg/m^2$ to 8 $mg/m^2$ as an amount of metal zirconium. If the adhesion amount of the zirconium film is set within this range, it is possible to secure corrosion resistance after retort treatment has been performed, and also it is possible to obtain a film having high homogeneity and excellent formability.

In addition, when the Zr—F oxide increases, excellent corrosion resistance and adhesiveness are exhibited, and the effect is clearly recognizable when the amount of metal P is 0.1 $mg/m^2$ or more. Furthermore, as the amount of a phosphoric acid film increases, the effect of improving corrosion resistance and adhesiveness also increases, but when the amount of the phosphoric acid film exceeds 50 $mg/m^2$ as an amount of P, the phosphoric acid film becomes too thick, and thus, the adhesiveness of the phosphorous film itself deteriorates, and also electrical resistance increases, which results in deterioration of weldability. Therefore, it is preferable that the adhesion amount of the phosphoric acid film be within a range of 0.1 $mg/m^2$ to 50 $mg/m^2$ as an amount of P. It is preferable that the adhesion amount of the phosphoric acid film be within a range of 0.1 $mg/m^2$ to 8 $mg/m^2$ as an amount of metal P. More preferably, the adhesion amount of the phosphoric acid film is within a range of 1 $mg/m^2$ to 6 $mg/m^2$ as an amount of metal P. If the adhesion amount of the phosphoric acid film is set within a range of 1 $mg/m^2$ to 6 $mg/m^2$, it is possible to secure corrosion resistance after retort treatment, and also it is possible to obtain a chemical conversion coating having high homogeneity.

Since F is contained in an aqueous solution for forming a chemical conversion coating, F is introduced into the chemical conversion coating together with the Zr compound. F contained in the film does not have an effect on coating material adhesiveness or film adhesiveness (primary adhesiveness), but becomes a cause of deterioration of adhesiveness (secondary adhesiveness) or rust resistance, or anticorrosiveness under the coating film during a high-temperature sterilization treatment such as a retort treatment. This is considered to be because F contained in the film elutes to water vapor or a corrosive liquid, and decomposes bonds with an organic film or corrodes an underlying steel sheet. When the amount of F contained in the film exceeds 0.1 $mg/m^2$, deterioration of these characteristics starts to become apparent. Therefore, it is preferable that the amount of F be set to 0.1 $mg/m^2$ or less. In order that the amount of F may be set to 0.1 $mg/m^2$ or less, a hydroxy acid-treated layer is formed on the chemical conversion coating, the layer is dried and then the dried layer is subjected to a washing treatment such as an immersion treatment in warm water or a spray treatment. If the treatment temperature is made high or the treatment time is made long, the amount of F may be reduced. Accordingly, for the purpose of setting the amount of F contained in the film to 0.1 $mg/m^2$ or less, it is preferable to perform the immersion treatment in warm water of 80° C. or higher, or spray treatment. After the washing treatment, drying is performed. Although not limited, it is preferable that the temperature at which drying is performed be 70° C. or higher.

The amount of metal Zr, the amount of P and the amount of F which are contained in the chemical conversion coating related to the invention, may be measured by a quantitative analysis method such as fluorescent X-ray analysis.

4. Hydroxy Acid-Treated Layer

A hydroxy acid-treated layer is provided on the chemical conversion coating that is obtained as described above. Although the method of providing the hydroxy acid-treated layer is not limited, a method of immersing the chemically coated steel sheet in a hydroxy acid aqueous solution or a method of applying the hydroxy acid aqueous solution onto the chemical conversion coating is preferred. Drying is performed after such immersion or application. Although not limited, it is preferable that the temperature at which drying is performed be 70° C. or higher. This is because drying may be sufficiently performed in a short time.

The hydroxy acid is a general term for an organic compound having a carboxylic group and an alcoholic hydroxyl group in one molecule, and at least one kind of acid selected from among a citric acid, a tartaric acid, a glycolic acid, a lactic acid, a glyceric acid, a mandelic acid, and the like, may be used in the invention. The hydroxy acid may be used alone or in combination of two or more kinds. In addition, the hydroxy acid may be used in a state of being mixed with a phenol resin. The mixing ratio thereof is set to be leas than 50% by mass on a basis of an organic component.

As the method of forming the hydroxy acid-treated layer, a method in which the hydroxy acid is dissolved in water or an organic solvent, the resultant solution is applied onto a steel sheet and then drying is performed is appropriate. As the application method, various known coating methods may be used. A step of heating the steel sheet may be provided as necessary so as to shorten drying time. After the film is formed by the drying, it is preferable that the steel sheet be subjected to a water-washing step to remove surplus hydroxy acid and/or F that remains on the metal. In this case, particularly strong water-washing is not necessary, and immersion in a water tank or water spray is sufficient. After the water-washing, drying is performed again, whereby the steel sheet is ready for practical use.

When the adhesion amount of the hydroxy acid-treated layer is less than 0.05 mg/m$^2$ as an amount of C, the effect of improving resin adhesiveness is not sufficient, and when the adhesion amount of the hydroxy acid-treated layer exceeds 50 mg/m$^2$, cohesive failure occurs in the organic film, and thus there is a concern that the resin adhesiveness may decrease. Therefore, it is preferable that the adhesion amount of the hydroxy acid-treated layer be 0.05 mg/m$^2$ to 50 mg/m$^2$. The amount of C contained in the hydroxy acid-treated layer may be measured by using TOC (total organic carbon analyser), and by subtracting the amount of C existing in the steel sheet.

In the adhesive film of the invention having the Zr compound chemical conversion coating and the hydroxy acid-treated layer on the steel sheet of the invention, since the hydroxy acid-treated layer makes up an interface in which a lot of functional groups are present, when a resin-coating layer is further formed as an upper layer, film adhesiveness between the hydroxy acid-treated layer and the upper layer is high.

5. Organic Resin Coating (Laminate)

A resin-coated steel sheet may be manufactured from the steel sheet for containers of the invention by coating the chemical conversion coating with a resin. As described above, the steel sheet for containers of the invention exhibits excellent film adhesiveness (highly-formed-film adhesiveness) at a highly formed portion. This is considered to be because the hydroxy acid-treated layer has a lot of functional groups and chemically combines with the resin film (organic resin).

Although not particularly limited, examples of the resin which is coated on the original steel sheet for containers or the surface-treated steel sheet include various thermoplastic resins or thermosetting resins. Examples of the resin include olefin-based resin films such as polyethylene, polypropylene, ethylene-propylene copolymer, ethylene-vinyl acetate copolymer, ethylene-acryl ester copolymer and ionomer; polyester films such as polybutylene terephthalate; polyamide films such as nylon 6, nylon 6,6, nylon 11, and nylon 12; and non-stretched or bi-axially stretched thermoplastic resin films such as polyvinyl chloride film and polyvinylidene chloride film. In the case where an adhesive is used at the time of lamination, a urethane-based adhesive, an epoxy-based adhesive, an acid modified olefin resin-based adhesive, a copolyamide-hased adhesive, copolyester-based adhesive, or the like (thickness; 0.1 µm to 50 µm) is preferably used. Furthermore, as the adhesive, a thermosetting coating material may be applied on a surface-treated steel sheet side or a film side with a thickness ranging from 0.05 µm to 2 µm.

Furthermore, thermoplastic or thermosetting coating materials may be used alone or in a combination of two or more kinds. Examples of the thermoplastic or thermosetting coating materials include a modified epoxy coating material such as phenol epoxy and amino-epoxy; a vinyl coating material such as vinyl chloride-vinyl acetate copolymer, vinyl chloride-vinyl acetate saponified copolymer and vinyl chloride-vinyl acetate-maleic anhydride copolymer; a modified vinyl coating material such as an epoxy modified, epoxy amino modified- or epoxy phenol modified-vinyl coating material; an acrylic coating material; and a synthetic rubber-based coating material such as a styrene-butadiene-based copolymer.

It is preferable that the thickness of the resin-coating layer be set within a range of 3 µm to 50 µm, and more preferably within a range of 5 µm to 40 µm. This is because when the thickness is smaller than the range, there is insufficient corrosion resistance, and when the thickness exceeds the range, there is a tendency for a problem regarding formability to occur.

Formation of the resin-coating layer on the hydroxy acid-treated steel sheet of the invention may be performed by arbitrary means. For example, the formation may be performed by an extrusion coating method, a cast film thermal adhesion method, a bi-axially stretched film thermal adhesion method, or the like. In the case of the extrusion coating method, a resin is extrusion-coated on the surface-treated steel sheet in a melted state and is thermally adhered to the steel sheet to form the resin-coating layer. That is, the resin is melted and kneaded by an extruder, and then the resin is extruded from a T-die in a thin file state. The melted resin film that is extruded and the surface-treated steel sheet are made to pass through a pair of laminating rolls to be pressed and integrated with each other while being cooled, and than the extrusion-coating multiple resin coating layers, plural extruders for respective layers are used. Resins from respective extruders are made to meet in a multiple multi-layer dies, and then the extrusion coating is performed similarly to the case of a single-layer resin. In addition, the surface-treated steel sheet may be made to vertically pass between a pair of laminating rolls, and a melted resin web may be supplied to both sides of the surface-treated steel sheet to form a resin-coating layer on both surfaces of the surface-treated steel sheet.

The resin-coated steel sheet obtained is applicable to a three-piece can having a lateral joint or a seamless can (two-piece can). In addition, the resin-coated steel sheet is applicable to an easy open can lid of a stay-on-tab type, an easy open can lid of a full-open type, or the like.

6. Metallic Can and Can Lid

As the method of manufacturing the metallic can, an arbitrary method of manufacturing a can may be used as long as the can is formed from the above-described resin-coated steel sheet. The metallic can may be a three-piece can having a lateral joint, but generally, a seamless can (two-piece can) is preferable. The seamless can may be manufactured by a known forming method such as drawing and re-drawing; bending and stretching by drawing and re-drawing (stretching); bending, stretching and ironing by drawing and re-drawing, or drawing and ironing; and necking of a neck portion, such that the organic resin-coated surface of the resin-coated steel sheet is the inner surface side of the can.

The can lid may be manufactured by an arbitrary known method as long as the can lid is formed from the above-described resin-coated steel sheet. Generally, the can lid may be manufactured by the method of forming the easy open can lid of the stay-on-tab type or the easy open can lid of the full-open type.

The above description is given as an example of the embodiment of the invention, and various modifications may be made within the range of claims of the invention.

EXAMPLES

Hereinafter, examples are shown and the invention is described in detail. The invention is not limited thereto.

Surface Treatment Layer on Steel Sheet

A surface treatment layer was provided on a steel sheet having a sheet thickness of 0.17 mm to 0.23 mm by using the following treatment methods (1) to (6).

(Treatment Method 1)

A base sheet, which was annealed and tempered after cold rolling, was degreased and acid-washed. Then, Sn-plating was performed using a ferrostan bath, whereby a Sn-plated steel sheet was manufactured.

(Treatment Method 2)

After cold rolling, Ni-plating was performed using a Watts-bath, and a Ni-diffused layer was formed during annealing, whereby a Ni-plated steel was manufactured.

(Treatment Method 3)

A base sheet, which was annealed and tempered after cold rolling, was degreased and acid-washed. Then, Sn-plating was performed using a ferrostan bath, and then a reflow treatment was performed, whereby a Sn-plated steel sheet having a Sn alloy layer was manufactured.

(Treatment Method 4)

A base sheet, which was annealed and tempered after cold rolling, was degreased and acid-washed. Then, Fe—Ni alloy plating was performed using a sulfuric acid-hydrochloric acid bath, and, Sn-plating was performed using a ferrostan bath, whereby a Ni and Sn-plated steel sheet was manufactured.

(Treatment Method 5)

A base sheet, which was annealed and tempered after cold rolling, was degreased and acid-washed. Then, Sn—Ni alloy plating was performed using a sulfuric acid-hydrochloric acid bath, whereby a Ni and Sn-plated steel sheet was manufactured.

(Treatment method 6)

After cold rolling, a steel base material (steel sheet) having a thickness of 0.17 mm to 0.23 mm was degreased and acid-washed. Then, Ni-plating was performed using a Watts-bath, a Ni-diffused layer was formed by annealing, and continuously, Sn-plating was performed using a ferrostan bath. Than, a melting treatment of tin was performed. Whereby, a Sn-plated steel sheet having a Sn—Ni alloy layer was manufactured.

The state of island-shaped Sn formation was confirmed by observing the surface of the plated steel sheet using an optical microscope, and it was confirmed that islands were entirely formed in Examples 7 and 8.

Method of Forming Chemical Conversion Coating

After providing the surface treatment layer by the above-described treatment, a chemical conversion coating was provided by the following treatment methods.

(A method)

The above-described steel sheet was immersed in a treatment liquid in which 4,000 mass ppm of Zr fluoride, 300 mass ppm of phosphoric acid, 0 or 700 mass ppm of phenol resin and 10,000 mass ppm of ammonium nitrate were dissolved, whereby Zr compound-phenol resin film was formed.

(B method)

The above-described steel sheet was immersed in a treatment liquid in which 1,500 mass ppm of Zr fluoride, 400 mass ppm of phosphoric acid, 0 or 300 mass ppm of phenol resin and 5,000 mass ppm of ammonium nitrate are dissolved, and a cathode electrolytic treatment was performed, whereby compound-phenol resin film was provided. Current density ($A/dm^2$) and time (second) in the cathode electrolytic treatment are shown in Table 1. The "-" represents not-treated or not-detected.

(C method)

The above-described steel sheet was immersed in a treatment liquid in which 1,500 mass ppm to 4,300 mass ppm of zirconium potassium fluoride, 300 mass ppm to 1,500 mass ppm of phosphoric acid and 1,000 mass ppm to 7,000 mass ppm of ammonium nitrate are dissolved, or was cathode-electrolytically treated in the treatment liquid, whereby a chemical conversion coating containing a Zr compound (example) was provided. Current density ($A/dm^2$) and time (second) in the cathode electrolytic treatment are shown in Table 1.

Provision of Hydroxy Acid-Treated Layer

A hydroxy acid aqueous solution shown in Table 1 with a concentration shown in Table 1 was applied onto the chemical conversion coating formed by using a roll coater. Alternatively, immersion was performed and then, squeezing using a squeeze roller was performed.

Water-Washing Treatment

After the hydroxy acid-treated layer was provided by the above-described treatment, drying and water-washing treatment ware performed by the following process to control the amount of F contained in the film, and then drying was performed.

(W1 Method)

Drying was performed at 0° C., immersion into warm water of 80° C. was performed, and drying was performed at 40° C.

(W2 Method)

Drying was performed at 40° C., immersion into warm water of 85° C. was performed, and drying was performed at 70° C.

(W3 Method)

Drying was performed at 30° C., immersion into warm water of 80° C. was performed, and drying was performed at 40° C.

(W4 Method)

Drying was performed at 70° C., spraying of warm water of 80° C. was performed, and drying was performed at 70° C.

In the examples, the amount of metal Ni and the amount of metal Sn contained in the surface treatment layer were measured in accordance with a fluorescent X-ray method and were specified using a calibration curve. In addition, the amount of metal Zr, the amount of P and the amount of F contained in the Zr compound film were measured by a quantitative analysis method such as fluorescent X-ray analysis. The amount of C contained in the hydroxy acid-treated layer was measured by using TOC (total organic carbon analyser), and by subtracting the amount of C existing in the steel sheet.

Performance Evaluation

Performance evaluation related to respective items (A) to (G) shown below was performed with respect to test materials to which of the above-described treatment was performed. In the highly-formed film adhesiveness of (A), the peeled area ratio of the examples was less than 1%, and the film adhesiveness was excellent. However, the peeled area ratio in all of the comparative examples was 1% or more, and there was a problem regarding the film adhesiveness at a highly formed portion. With regard to the respective items (B) to (G), similarly to the comparative examples, the examples were excellent.

(A) Highly-Formed-Film Adhesiveness Was Evaluated by the Following Test.

Each of the test materials was laminated with an isophthalic acid copolymerization polyethylene terephthalate film having a stretching ratio of 3.1×3.1 at a thickness of 20 µm, a thickness of 25 µm, a copolymerization ratio of 12 mol % and a melting point of 224° C. on both surfaces thereof under laminating conditions such that the bi-axial orientation degree (BO value) of the film became 150, that is, under laminating conditions of a steel sheet feeding speed of 40 m/min, a nip length of a rubber roll of 17 mm, and a time taken from compression to water cooling of 1 sec., whereby the resin-coated steel sheets of the examples and the comparative examples were manufactured. Here, the nip length represents the length of the portion at which the rubber roll and the steel sheet come into contact with each other in a conveyance direction. The resin-coated steel sheet obtained was subjected to drawing and ironing to manufacture a can body, and the neck portion of the can drum of the can body was formed (necking). Then, the can body was subjected to a retort treatment at 120° C. for 30 minutes, and the state of peeling of the resin film at the neck portion of the can drum was observed. Evaluation was performed based on a peeled area ratio using a five-grade system (A: peeled area ratio is 0%, B: peeled area ratio is less than 1%, C: peeled area ratio is 1% to 2%, D: peeled area ratio exceeds 2%, but is equal to or less than 10%, and E: peeled area ratio exceeds 10%). The results are shown in Table 1.

(B) Formability

Both surfaces of each of the test materials were laminated with a PET film having a thickness of 20 µm at 200° C., the resultant test material was subjected stepwise to can manufacturing forming which involves drawing and ironing, and cracking, floating and peeling of the film were observed. The shape was evaluated based on area ratios of cracking, floating and peeling, and cracking, floating and peeling of the film were not recognized.

(C) Weldability

By using a wire seam welding machine, each of the test materials was welded by changing the current and under a condition of a welding wire speed of 80 m/min. Then, the weldability was comprehensively judged and evaluated based on the size of the appropriate current range including the minimum current at which a sufficient welding strength is obtained and the maximum current at which welding defects such as dust and welding sputter begin to be observed. The appropriate current of the secondary side was 1500 A or more.

(D) Primary Coating Material Adhesiveness

An epoxy-phenol resin was applied to each of the test materials and was baked at 200° C. for 30 minutes. Then, a grid-shaped cut was made into the resultant coating film with a depth reaching the steal sheet and an interval of 1 mm, peeling of the coating film was performed with peeling tape, and the state of peeling was observed. As a result of evaluation based on a peeled area ratio, the peeled area ratio was found to be 0%.

(E) Secondary Coating Material Adhesiveness

An epoxy-phenol resin was applied to each of the test materials and was baked at 200° C. for 30 minutes. Thereafter, a grid-shaped cut was made into the resultant coating film with a depth reaching the steel sheet and an interval of 1 mm, the test material was subjected to a retort treatment at 125° C. for 30 minutes, and drying was performed. Then, peeling of the coated film was performed with a peeling tape, and the state of peeling was observed. As a result of evaluation based on a peeled area ratio with a four-grade system, the peeled area ratio was found to be 0%.

(F) Corrosion Resistance Under Coating Film

An epoxy-phenol resin was applied to each of the test materials and was baked at 200° C. for 30 minutes. Then, a cross-cut was made into the resultant coating film with a depth reaching the steel sheet, the test material was immersed in a test liquid that was a mixed liquid of 1.5% by mass of a citric acid-1.5% by mass of salt at 45° C. for 72 hours, and washing and drying were performed. Then, peeling of the coating film was performed with a peeling tape, and the state of corrosion under the coating film at the cross-cut portion and the state of corrosion at a flat sheet portion were observed. As a result of evaluation based on both the width of corrosion under the coating film and the corrosion area ratio of the flat sheet portion, the corrosion width under the coating film was found to be less than 0.2 mm, and the corrosion area ratio of the flat portion was found to be 0%.

(G) Retort Rust Resistance

Each of the test materials was subjected to a retort treatment at 125° C. for 30 minutes, and the degree of rust occurrence was observed. As a result of evaluation based on a rust occurrence area ratio, the rust occurrence area ratio was found to be 0%.

TABLE 1

| | | Surface treatment layer | | | Chemical conversion coating (Zr, phosphoric acid, Comparative Examples include phenol resin) | | | | |
|---|---|---|---|---|---|---|---|---|---|
| | Numbers | Treatment method | Amount of Sn (mg/m$^2$) | Amount of Ni (mg/m$^2$) | Chemical conversion coating forming method | Current density (A/dm$^2$) | Electrolytic time (sec) | Water washing method | Adhesion amount of Zr (mg/m$^2$) |
| Comparative Examples | 1 | 5 | 950 | 120 | A | — | — | 85° C. | 4 |
| | 2 | 1 | 188 | — | B | 2 | 2 | 85° C. | 12 |
| | 3 | 5 | 950 | 120 | A | — | — | 40° C. | 4 |
| | 4 | 1 | 188 | — | B | 2 | 2 | 40° C. | 12 |
| | 5 | 3 | 7800 | 24 | A | — | — | 40° C. | 4 |
| | 6 | 2 | — | 450 | A | — | — | 40° C. | 15 |
| Examples | 1 | 5 | 950 | 120 | A | — | — | 85° C. | 4 |
| | 2 | 1 | 188 | — | C | 2 | 2 | 85° C. | 12 |
| | 3 | 3 | 7800 | 24 | C | 3.5 | 0.4 | 85° C. | 4 |

TABLE 1-continued

| | | | | | | | | | |
|---|---|---|---|---|---|---|---|---|---|
| 4 | 3 | 1150 | 15 | A | — | — | 50° C. | 10 | |
| 5 | 2 | — | 950 | B | 28 | 2 | 80° C. | 45 | |
| 6 | 5 | 450 | 290 | C | 60 | 2 | 83° C. | 83 | |
| 7 | 6 | 1000 | 50 | C | 3 | 0.2 | 45° C. | 0.2 | |
| 8 | 6 | 2800 | 50 | C | 5 | 0.2 | 80° C. | 2.1 | |

| | | Chemical conversion coating (Zr, phosphoric acid, Comparative Examples include phenol resin) | | | Hydroxy Acid-treated layer | | | | Evaluation |
|---|---|---|---|---|---|---|---|---|---|
| | Numbers | Adhesion amount of F (mg/m$^2$) | Adhesion amount of P (mg/m$^2$) | Adhesion amount of C in phenol resin (mg/m$^2$) | Adhesion amount of C (mg/m$^2$) | Kind and Concentration | Manufacturing method | Drying and water washing | Highly-formed film adhesiveness |
| Comparative Examples | 1 | 0.01 or less | | 2 | — | — | — | — | C |
| | 2 | 0.01 or less | 18 | 15 | — | — | — | — | C |
| | 3 | 0.02 | 1 | 2 | — | — | — | — | D |
| | 4 | 0.03 | 18 | 15 | — | — | — | — | D |
| | 5 | 0.01 or less | 0.2 | 2 | — | — | — | — | B |
| | 6 | 0.09 | 24 | 5 | — | — | — | — | C |
| Examples | 1 | 0.01 or less | 1 | — | 3 | Glycolic acid 1.1 g/l | Application of aqueous solution | W1 | A |
| | 2 | 0.01 or less | 18 | — | 20 | Glycolic acid 7.3 g/l | Application of aqueous solution | W2 | A |
| | 3 | 0.01 or less | 18 | — | 21 | Lactic acid 6.0 g/l | Application of aqueous solution | W4 | B |
| | 4 | 0.09 | 1 | — | 2.5 | Glycolic acid 0.47 g/l | Immersion in aqueous solution | W2 | B |
| | 5 | 0.01 or less | 24 | — | 30 | Glycolic acid 11.1 g/l | Application of aqueous solution | W1 | A |
| | 6 | 0.01 or less | 45 | — | 45 | Glycolic acid 15.8 g/l | Application of aqueous solution | W3 | A |
| | 7 | 0.01 or less | 0.1 | — | 0.2 | Glycolic acid 0.03 g/l | Immersion in aqueous solution | W4 | B |
| | 8 | 0.01 or less | 0.8 | — | 0.8 | Glycolic acid 0.32 g/l | Application of aqueous solution | W3 | B |

The invention claimed is:

1. A steel sheet for containers providing highly-formed film adhesiveness, having:
   a chemical conversion coating which is formed by immersing or electrolytically treating a steel sheet in a solution containing Zr ions, F ions and P ions, the adhesion amount of which is within a range of 4 mg/m$^2$ to 83 mg/m$^2$ as an amount of metal Zr and 0.01 mg/m$^2$ or less as an amount of F and 1 mg/m$^2$ to 45 mg/m$^2$ as an amount of P; and
   a glycolic acid-treated layer which is formed on the chemical conversion coating, and the adhesion amount of which is within a range of 3 mg/m$^2$ to 45 mg/m$^2$ as an amount of C.

2. The steel sheet for containers providing highly-formed film adhesiveness according to claim 1,
   wherein the steel sheet is a surface-treated steel sheet having a surface treatment layer which contains 5 mg/m$^2$ to 1,000 mg/m$^2$ of Ni or 100 mg/m$^2$ to 15,000 mg/m$^2$ of Sn, on at least one surface thereof.

3. The steel sheet for containers providing highly-formed film adhesiveness according to claim 1,
   wherein the steel sheet is a surface-treated steel sheet having an underlying Ni layer which is a Ni plating layer or an Fe—Ni alloy plating layer and contains 5 mg/m$^2$ to 150 mg/m$^2$ of Ni, the underlying Ni layer having thereon formed 300 mg/m$^2$ to 3,000 mg/m$^2$ of a Sn plating layer, a part or the entirety of the underlying Ni layer being alloyed with a part of the Sn plating layer by a tin melting treatment to form an intermediate layer formed from a single layer of a Sn—Ni alloy layer or an Fe—Sn—Ni alloy layer, or an intermediate layer formed from a composite layer of a Ni layer as the lowest layer and a Sn—Ni alloy layer formed on an upper surface of the lowest layer, or an intermediate layer formed from a composite layer of an Fe—Ni layer as the lowest layer and an Fe—Sn—Ni alloy layer formed on the upper surface of the lowest layer, the surface-treated steel sheet further comprising on an upper surface of the intermediate layer a Sn island plating layer formed from a remainder of a Sn plating layer which is not alloyed.

4. The steel sheet for containers providing highly-formed film adhesiveness according to claim 2,
wherein the steel sheet is a surface-treated steel sheet having an underlying Ni layer which is a Ni plating layer or an Fe—Ni alloy plating layer and contains 5 mg/m$^2$ to 150 mg/m$^2$ of Ni, the underlying Ni layer having thereon formed 300 mg/m$^2$ to 3,000 mg/m$^2$ of a Sn plating layer, a part or the entirety of the underlying Ni layer being alloyed with a part of the Sn plating layer by a tin melting treatment to form an intermediate layer formed from a single layer of a Sn—Ni alloy layer or an Fe—Sn—Ni alloy layer, or an intermediate layer formed from a composite layer of a Ni layer as the lowest layer and a Sn—Ni alloy layer formed on an upper surface of the lowest layer, or an intermediate layer formed from a composite layer of an Fe—Ni layer as the lowest layer and an Fe—Sn—Ni alloy layer formed on the upper surface of the lowest layer, the surface-treated steel sheet further comprising on an upper surface of the intermediate layer a Sn island plating layer formed from a remainder of a Sn plating layer which is not alloyed.

5. A method of manufacturing a steel sheet for containers providing highly-formed film adhesiveness according to claim 1, the method comprising:
immersing or electrolytically treating the steel sheet in the solution containing Zr ions, F ions and P ions to form the chemical conversion coating on the steel sheet, and
immersing the steel sheet having the chemical conversion coating in the glycolic acid-containing aqueous solution, or applying the glycolic acid-containing aqueous solution onto the chemical conversion coating, and drying the resultant steel sheet.

6. The method of manufacturing a steed sheet for containers providing highly-formed film adhesiveness according to claim 5, wherein the temperature of the drying step is 70° C. or higher.

7. The method of manufacturing a steel sheet for containers providing highly-formed film adhesiveness according to claim 5,
wherein after the drying step, the steel sheet is washed with water having a temperature of 80° C. or higher and is further dried.

8. The method of manufacturing a steel sheet for containers providing highly-formed film adhesiveness according to claim 5, wherein the steel sheet is a surface-treated steel sheet having a surface treatment layer which contains 5 mg/m$^2$ to 1,000 mg/m$^2$ of Ni or 100 mg/m$^2$ to 15,000 mg/m$^2$ of Sn, on at least one surface thereof.

9. The method of manufacturing a steel sheet for containers providing highly-formed film adhesiveness according to claim 5,
wherein the steel sheet is a surface-treated steel sheet having an underlying Ni layer which is a Ni plating layer or an Fe—Ni alloy plating layer and contains 5 mg/m$^2$ to 150 mg/m$^2$ of Ni, and a Sn island plating layer which is a remainder of a Sn plating layer and is not alloyed, the Sn island plating layer being formed by plating 300 mg/m$^2$ to 3,000 mg/m$^2$ of Sn on the underlying Ni layer, and alloying a part or the entirety of the underlying Ni layer and a part of the Sn plating layer by performing a tin melting treatment.

* * * * *